July 1, 1924.

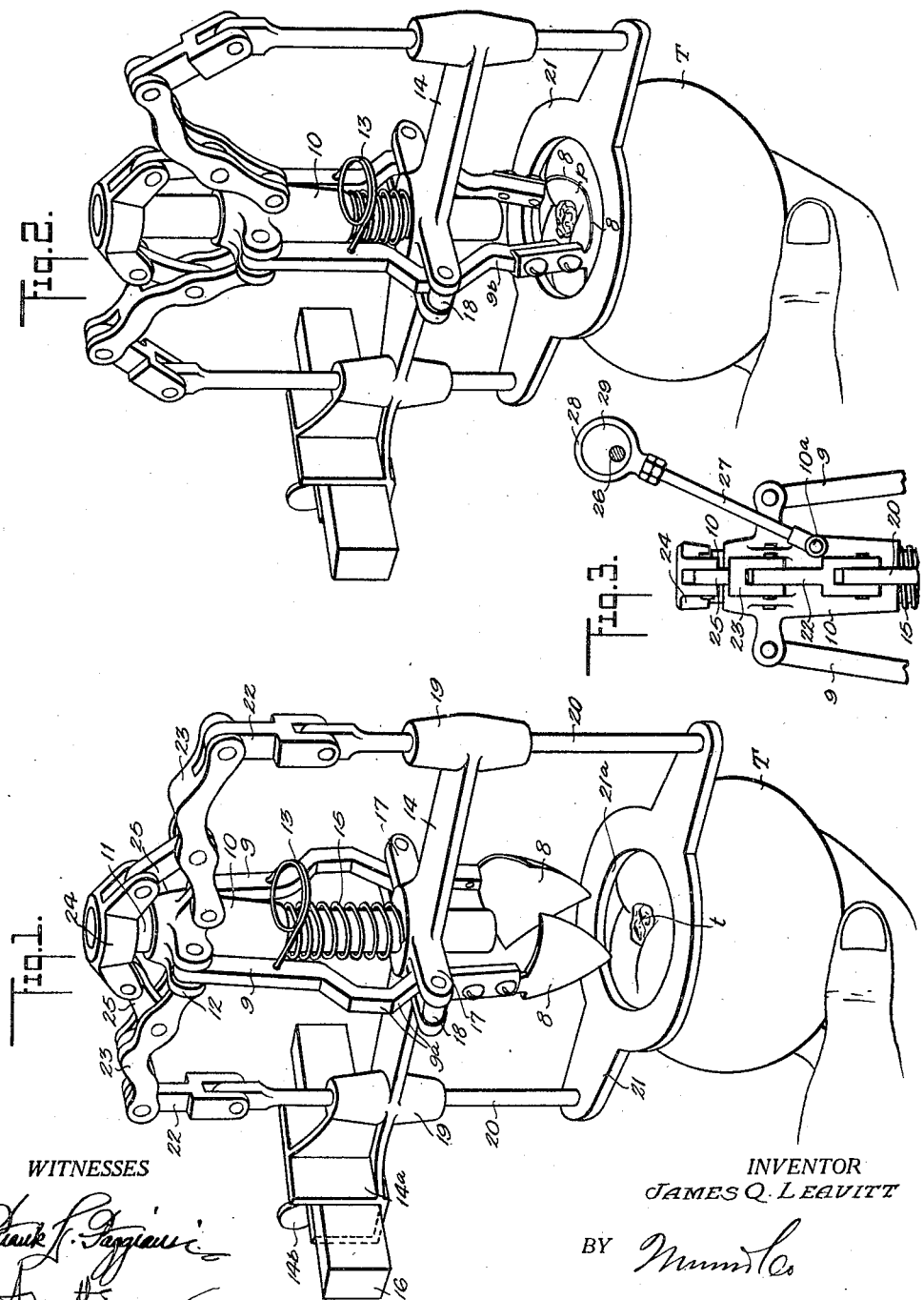

J. Q. LEAVITT

TOMATO CORER

Filed Oct. 31, 1923    3 Sheets-Sheet 2

1,500,085

INVENTOR
JAMES Q. LEAVITT
BY
ATTORNEYS

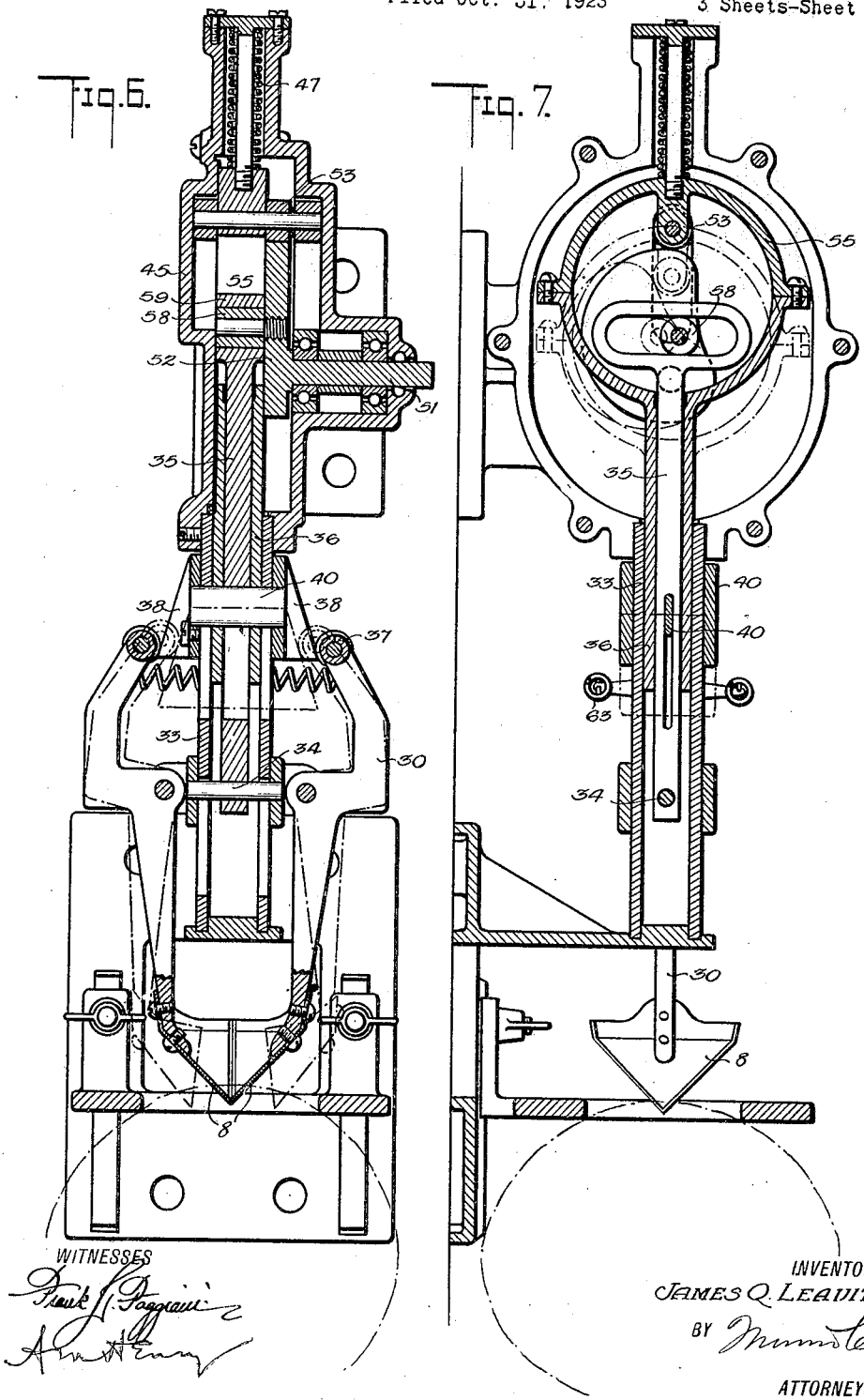

Patented July 1, 1924.

1,500,085

UNITED STATES PATENT OFFICE.

JAMES Q. LEAVITT, OF OGDEN, UTAH.

TOMATO CORER.

Application filed October 31, 1923. Serial No. 671,914.

*To all whom it may concern:*

Be it known that I, JAMES Q. LEAVITT, a citizen of the United States, and a resident of Ogden, in the county of Weber and State of Utah, have invented a certain new and Improved Tomato Corer, of which the following is a full, clear, and exact description.

This invention relates to the art of decoring or otherwise trimming or shaping vegetables or fruits, such as tomatoes, preparatory to cooking, preserving or canning the same; and more particularly aims to provide a novel and improved means for automatically or semi-automatically trimming tomatoes to remove from the vicinity of the stem base a substantially conical or similar portion of the axial central mass of the tomato.

The invention will be more clearly understood from the following description, when taken in connection with the accompanying drawings showing several of many possible embodiments of the invention, and in which drawings, Fig. 1 is a perspective view of one embodiment with the tomato placed in position ready to be acted on by the machine;

Fig. 2 is a view similar to Fig. 1, but showing the cutting spoons deep in the tomato as a result of having utilized an upward thrust of the latter to actuate the machine;

Fig. 3 is a fragmentary view showing in end elevation a slightly modified construction whereby an eccentric-type or other power means is employed to actuate the spoons relative to the tomato;

Fig. 6 is a view exactly like Fig. 4, but showing the parts in full-lines in one different adjustment and in broken lines in another different adjustment; and Fig. 7 is a view exactly like Fig. 5, but showing several different adjustments of the parts in agreement with similar showings of Fig. 6.

Figure 4:
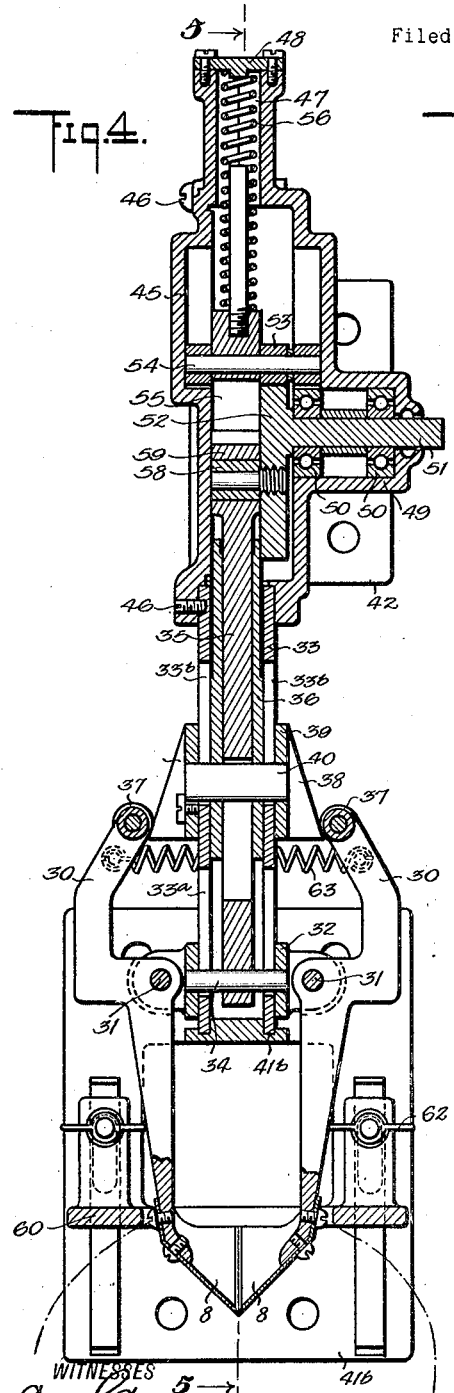
Fig. 4 is a vertical axial section, taken substantially on the line 4—4 of Fig. 5, showing a different embodiment but also a power-driven one.

One of the important features of the invention, as will be seen at this point, is the provision of a plurality of cutting spoons 8 or equivalents so controlled that the two spoons advance practically as one unit toward and into the tomato, are advanced toward each other during or subsequent to their point-piercing relative to the tomato meat, then are removed from the tomato with the decored portion of the latter nested or clasped between the concavities of the spoons, and then are finally separated to release the decored portion, so as to return to normal spaced relation and to be ready for a repetition of the process just described; preferably the two first-mentioned steps of such process are performed during an advance of the spoon mounts substantially axially relative to the tomato, and the remaining steps are performed during a return stroke of such mounts; and preferably, also, the spoons and the tomato are not rotated relatively.

Now refering particularly to the embodiment of Figs. 1 and 2, each spoon is rigidly mounted at the lower end of a link 9 dependent from pivotal mounts for their upper ends afforded by lug-structures carried on opposite sides of a sleeve 10 slidable vertically on a cylindrical rod-standard 11; one of such lug-structures being indicated at 12. These links 9 are normally urged toward the expanded position of Fig. 1 by means of loop-spring 13 the opposite ends of which are secured to said links.

Sleeve 10 is normally held in elevated position on standard 11, and relative to main bracket 14, by means of an expansile coil spring 15 surrounding standard 11 between sleeve 10 and bracket 14; which bracket may carry suitable adjustable clamping means as indicated at 14$^a$ and 14$^b$, the latter element being a thumb-screw familiar in the art of clamping devices, whereby the bracket and the entire device may be adjustably mounted on a suitable fixed block or rail 16.

In order that when sleeve 10 and consequently links 9 are moved downwardly relative to bracket 14, the spoons will be advanced toward each other transversely of the line of travel of said sleeve and against the tension of spring 13, the following means are provided: Oppositely offset from bracket 14 are lug-structures 17 mounting anti-friction rollers as indicated at 18, and the links are bowed outwardly and so shaped as to provide cam surfaces such as those indicated at 9$^a$ in the case of the near link of Fig. 1, so that on a downward movement of sleeve 10 relative to the bracket, to the extent indicated in Fig. 2, the spoons are forced in toward each other.

Bracket 14 at its outer end and at a point adjacent to structure 14ª at its other end carries a pair of barrel enlargements 19 vertically parallelly bored to establish slide bearings for cylindrical rods 20 mounting at their lower ends a pressure plate 21. The upper ends of rods 20 are pivotally connected as shown to short arms 22 pivotally hung from the outer ends of a pair of substantially horizontal arms 23 pivotally mounted at their inner ends to suitable lug-structures carried at opposite sides of the sleeve 10 and overlying the main line of extension of bracket 14. Secured to the top of standard 11 is a crown fixture 24 pivotally mounting as shown the upper ends of links 25 the lower ends of which are pivotally connected to horizontal arms 23 intermediate the ends of the latter.

In operation, the tomato T, held in the hand of the attendant as shown, is brought up to apply its stem base $t$ centrally of the confines of the circular opening 21ª in plate 21 and so as to contact the surrounding upper part of the tomato against the under-surface of the ring portion of the plate. Thereupon manual upward pressure is applied to plate 21, through the medium of the tomato, sufficient to push the plate upwardly from the position shown in Fig. 1 to that shown in Fig. 2. During such upward movement of the plate, the tomato advances toward the spaced spoons 8 until the lowermost piercing points of the latter enter or are about to enter the tomato, whereupon the cam means including the rollers 18 and the cam surfaces 9ª on the links 9 initiate and conduct an advance of the spoons toward each other and while the spoons are cutting deeper into the meat of the tomato, with the result that finally, as shown in Fig. 2, the spoons are close together and nest between them a decored portion $p$ of the tomato as shown in the latter view. On now removing the tomato, the spring 15 functions to cause the plate 21 to descend again toward the position of Fig. 1, leaving behind the spoons and their nested tomato portion $p$. As soon as the plate descends a sufficient distance to bring the faces 9ᵇ of links 9 opposite rollers 18, which is the condition shown in Fig. 1, the spoons are again snapped apart, by the action of leaf-spring 13, and the decored portion $p$ of the tomato is free to drop clear of the machine by gravity.

Referring now to Fig. 3, the same is a variation of the structure of Figs. 1 and 2 only in so far as the upper works of the machine are concerned; the object of this modification being to disclose a full-automatic type of machine and one wherein the plate 21 is periodically moved up and down relative to rod-standard 11 by power means, such as a horizontal shaft 26 serving one or a battery of the machines of Figs. 1 and 2 or equivalents arranged in line—it of course being understood that tomatoes are subjected to the cutting spoons of each machine at such intervals, preferably, as to make each downstroke of sleeve 10 one for doing useful work, and it being further understood that such tomatoes may be fed by hand or by suitable automatic or semi-automatic apparatus not forming a part of the present invention and hence not shown.

The parts shown in Fig. 3 correspond exactly to those shown in Figs. 1 and 2; the parts shown in the former view including, in addition to the standard 11 and sleeve 10 already mentioned, the links 9, the crown-piece 24, the links 25, the horizontal arms 23, the links 22, the rods 20 and the expansile coil spring 15. Here, however, sleeve 10 is pivotally connected as indicated at 10ª to a rod 27 carrying at its other end an eccentric strap 28 sleeving an eccentric 29 fast on horizontal drive shaft 26.

Referring now to Figs. 4, 5, 6 and 7, spoons 8 are carried rigidly at the lower ends of arms 30, each arm fulcrumed intermediate its ends, as indicated at 31 in Fig. 4, to suitable lugs at opposite sides of a ring 32 loose on a fixed guiding sleeve 33; such ring being hereinafter referred to as the lower outer slide-ring. This ring is slidable vertically along fixed guiding sleeve 33, and to that end said sleeve is longitudinally slotted at opposite sides as indicated at 33ª in Fig. 4, to accommodate a cylindrical cross-pin 34 mounting lower outer slide ring 32 on the lower end of a main or central slide rod 35 reciprocable within a sliding main sleeve 36 in turn reciprocable within fixed guiding sleeve 33.

Arms 30 at their upper ends carry rollers 37 co-acting with ramps 38 on opposite sides of a ring 39 loose also on fixed guiding sleeve 33, such ring being hereinafter referred to as the upper outer slide ring. This ring 39, further, also is slidable vertically along fixed guiding-sleeve 33, and to that end the latter is longitudinally slotted at opposite sides as indicated at 33ᵇ in Fig. 4 to accommodate a vertically flattened cross-pin 40 mounting upper outer slide ring 39 on the lower end of the sliding main sleeve 36 reciprocable as above within fixed guiding sleeve 33.

Figure 5:
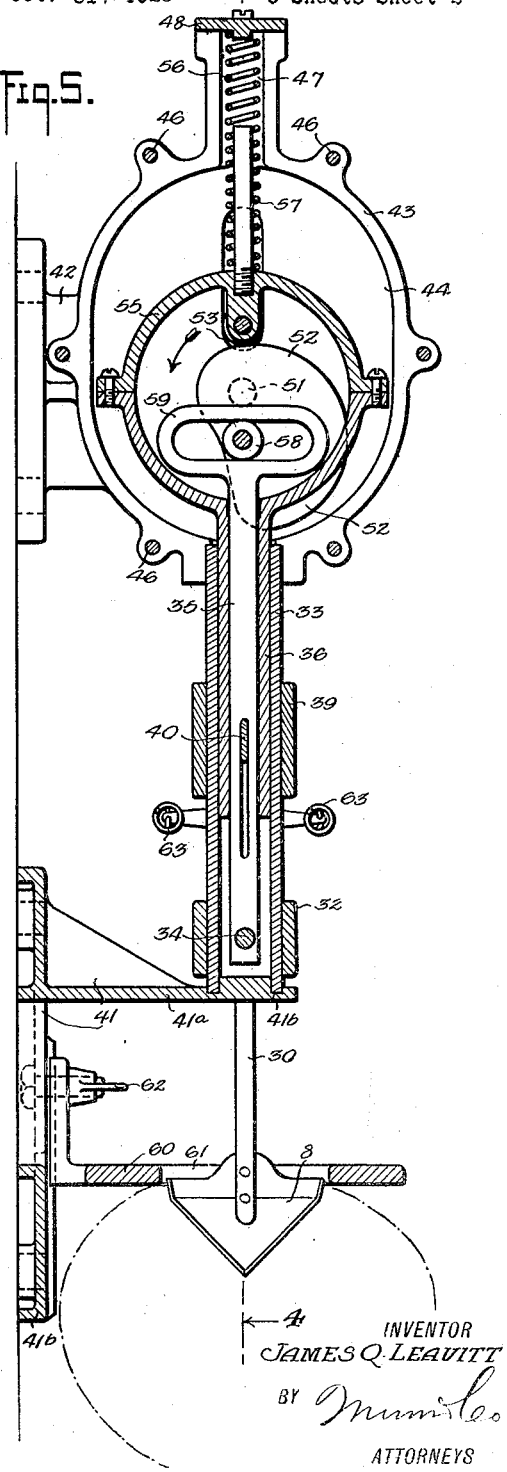
Fig. 5 is a view similar to Fig. 4 but taken on a line 5—5 of Fig. 4.

The parts as so far described, and the whole machine as will be seen in a moment, are supported in operative relation by provisions including a lower main bracket 41 the outer end of the upper leaf 41ª of which carries at its upper surface an annular recess 41ᵇ within which the lower end of fixed guiding sleeve 33 is set, and further including an upper bracket 42, cast integral with which, as best shown in Fig. 5, is the main hollow body of a casing 43 having an oblongovate chamber 44. This casing 43 is closed by a cover-casting marked 45 in Fig. 4 and bolted in place on casing 43 as indicated at 46. The matching upper and lower tubular portions of casing 43 and cover 45 are bored as shown, the lower tubular portion for securely mounting the upper end of fixed guiding sleeve 33, and the upper tubular portion for providing a recess 47 closed at the top by a removable cap 48. As shown best in Fig. 4, casing 43 has an offset hollow structure 49 comprising a cage for ball-bearings 50 for journalling a suitably driven power shaft 51 carrying within chamber 44 a reniform cam 52. This cam, together with a cam-follower roller 53 loose on a cross-shaft 54 set in the ring-like head 55 of main sliding sleeve 36, and together with an expansile coil spring 56 set in recess 47 and sleeving an upstanding pin 57 on head 55, constitute the means for predeterminedly, during one complete revolution of shaft 51, giving one complete down and one complete up or return stroke to main sliding sleeve 36 and consequently to upper outer ring 39.

Cam 52 also, during each complete revolution of main power shaft 51, constitutes a part of the means for predeterminedly imparting a complete down-stroke and a complete up or return stroke to main or central slide rod 35, and consequently to lower outer slide ring 32 and arms 30 and the spoons 8 at the bottoms of the latter; such means further including an eccentric and slot connection between cam 52 and the central slide rod 35, comprising a roller 58 mounted eccentrically on the cam, and the horizontal slot within yoke head 59 of the slide rod and within which slot roller 58 plays.

Lower bracket 41 also includes a vertically adjustable lower leaf 60 having a central opening 61 for accommodating the upward and downward and closing and opening movements of spoons 8, and such leaf 60 is vertically adjustably carried by the main plate 41$^b$ of the lower bracket, by means of the dovetail rib and groove and thumb-screw means indicated at 61.

Operation: With the main shaft 51 rotating in the direction shown by the arrow in Fig. 5, and assuming the full-line positions of the parts shown in Figs. 6 and 7 represent the starting of a cycle of required operations relative to a single tomato, all of which operations are to be performed during a single complete revolution of said shaft, it will be noted that during about the first one-eighth revolution of the shaft the cam 52 lowers roller 53 to the position shown in dot-and-dash lines but the roller 58 is moved relative to yoke 59 so as not materially to change the elevation of such yoke, and consequently the parts are now, as just stated, in the dot-and-dash locations shown in Figs. 6 and 7, which is to say, that the spoons 8 are partially entered into the tomato and such spoons are almost if not quite completely separated due to the setting of the rollers 37 (on the upper ends of the spoon-carrying arms 30) on portions of the ramps 38 of lower height. During the next ensuing rotation of the cam to the extent of about three-eighths of a revolution, to bring the parts to the condition shown in Figs. 4 and 5, the roller 53 is lowered, due to the action of the spring 56, and with said roller is lowered the sliding main sleeve 36, and consequently the ramp-carrying or upper outer slide ring 39, while at the same time the roller 58 is moved relative to yoke 59 so as to lower to the maximum the main or central slide rod 35, and consequently the arms-mounting or lower outer slide ring 32; so that now the spoons 8 have cut down all the way into the tomato and have been closed in together to decore the tomato according to the invention. In this adjustment of the parts, it will be noted that the lower outer ring 32 mounting the fulcrums for the spoon-carrying arms 30 is at its lowermost position and the upper outer ring 39 carrying the ramps 38 is likewise at its lowermost position, and that accordingly the rollers 37 at the upper ends of the arms are on the highest points of said ramps. During the remaining part of the single revolution of cam 52 now being considered, necessary for returning the cam to the position shown in Figs. 6 and 7, the yoke 59 is again raised to its highest position, thus raising the lower outer ring 32 and the arms 30 and spoons 8; and during the first portion of the last-mentioned fractional rotation of the cam 52, the simultaneous raising of the cam follower roller 53 raises also the sliding main sleeve 36 and the upper outer ring 39 and the ramps 38, and consequently the spoons 8, while being raised, are nevertheless kept close together during said first portion of the fractional rotation of cam 52 now being considered. But during the latter portion of said fractional rotation of the cam 52, the cam follower roller 53 remains at about the same level, and consequently main sliding sleeve 36 is idle and the upper outer ring 39 is halted, as of course are also halted the ramps 38 carried thereby, with the result that the rollers 37 at the upper ends of arms 30 travel along the ramps from high to low points on the latter, thus permitting the retractile coil spring 63 joining arms 30 to swing in the upper ends of said arms as the latter travel upwardly, thereby to spread apart the spoons 8 on the lower ends of the arms, thereby in turn to release and drop by gravity the decored and elevated portion of the tomato.

Variations may of course be resorted to freely within the scope of the appended claims.

In such claims, wherever the word "object" is used, it is employed as designating a tomato or other fruit or vegetable.

I claim:

1. Apparatus of the kind described, including a mount carrying a plurality of rockably supported cutting spoons, a stop device against which the object to be treated is to be contacted, said mount and said device being relatively movable towards and from each other, and power means for automatically moving the spoons relatively during a relative movement between said mount and device, said means including a continuously rotating shaft and cam means operated thereby.

2. Apparatus of the kind described, including a mount carrying a plurality of rockably supported cutting spoons, a stop device against which the object to be treated is to be contacted, said mount and said device being relatively movable towards and from each other, and means for automatically moving the spoons relatively during a relative movement between said mount and device; there being provided a power means for moving said mount and device relatively and moving the spoons relatively, said means including a continuously rotating shaft and connected cam means operated thereby.

3. Apparatus of the kind described, including a mount carrying a plurality of rockably supported cutting spoons, a stop device against which the object to be treated is to be contacted, said mount and said device being relatively movable towards and from each other, and means for automatically moving the spoons relatively during a relative movement between said mount and device; there being provided a power means for moving said mount and device relatively, including a continuously rotating shaft, a connecting member and pin and slot means operating said member and operated periodically by the cam means.

4. Apparatus of the kind described, including a mount carrying a plurality of rockably supported cutting spoons, a stop device against which the object to be treated is to be contacted, said mount and said device being relatively movable towards and from each other, and means for automatically moving the spoons relatively during a relative movement between said mount and device; there being provided a power means for moving said mount and device relatively, including a sliding sleeve carrying said mount, a fixed guiding sleeve within said sliding sleeve, and a sliding element in the fixed sleeve and operatively connected to said sliding sleeve, and power means for reciprocating said sliding sleeve and sliding element predeterminedly but for dissimilar sliding strokes.

5. Apparatus of the kind described, including a mount carrying a plurality of rockably supported cutting spoons, a stop device against which the object to be treated is to be contacted, said mount and said device being relatively movable towards and from each other, and means for automatically moving the spoons relatively during a relative movement between said mount and device; there being provided a power means for moving said mount and device relatively including a sliding sleeve carrying said mount, a fixed guiding sleeve within said sliding sleeve, and a sliding ring on said fixed sleeve and operatively connected to said sliding sleeve.

6. Apparatus of the kind described, including a mount carrying a plurality of rockably supported cutting spoons, a stop device against which the object to be treated is to be contacted, said mount and said device being relatively movable, and means for automatically moving the spoons relatively during a relative movement between said mount and device; there being provided a power means for moving said mount and device relatively including a sliding sleeve carrying said mount, a fixed guiding sleeve within said sliding sleeve, and a sliding ring on said fixed sleeve and operatively connected to said sliding sleeve; there being also provided a sliding rod inside said sliding sleeve, and a sliding ring outside said fixed sleeve and operatively connected to said sliding rod; one of said rings carrying means for rockably mounting said spoons and the other of said rings carrying means for predeterminedly acting on the spoons to move the same relatively.

7. In a corer, a slidable member, a pair of pivoted and spring pressed spoon carrying arms carried by the said member, a slidable and spring pressed member, a rotatable shaft, means on the shaft for moving the slidable member against the action of its spring, means on the first means and coacting with the first slidable member for operating it, and means for moving the spoon carrying arms toward each other.

8. In a corer, a slidable member, a pair of pivoted and spring pressed spoon carrying arms carried by said member, a slidable arm having a ring like head provided with an internal projection, a spring means engaging the head, a power shaft, a cam on the shaft and adapted to engage the projection of the head, means on the cam and operatively connected with the first named slidable member, and means for moving the spoon carrying arms toward each other.

9. In a corer, a slidable member having a yoke shaped upper end, a pair of pivoted and spring pressed spoon carrying arms, carried by said member, a slidable member having a ring like head at its upper end, said head having an internal projection, spring means engaging the head, a power shaft, a cam on the shaft and adapted to engage the projection of the said head, a pin on the cam and extending into the yoke of the said member, and means for moving the spoon carrying arms toward each other.

10. In a corer, a stationary sleeve, a slidable sleeve in the first sleeve and having a ring-shaped head provided with an internal projection, spring means engaging the head, a member slidable on the stationary sleeve, pivoted and spring pressed spoon carrying arms mounted on said member, a slidable member in the slidable sleeve and having a yoke shaped end in the head thereof, a cam carrying member carried by the slidable sleeve and with which the spoon carrying arms engage, a power shaft, and a cam on said shaft and provided with a pin engaging the yoke shaped end of said slidable member.

JAMES Q. LEAVITT.